US006838860B2

(12) United States Patent
Huggett et al.

(10) Patent No.: US 6,838,860 B2
(45) Date of Patent: Jan. 4, 2005

(54) POWER GENERATING SYSTEM INCLUDING PERMANENT MAGNET GENERATOR AND SHUNT AC REGULATOR

(75) Inventors: Colin Huggett, Torrance, CA (US); Gabor Kalman, Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 68 days.

(21) Appl. No.: 09/957,735

(22) Filed: Sep. 21, 2001

(65) Prior Publication Data

US 2003/0057926 A1 Mar. 27, 2003

(51) Int. Cl.[7] .......................... H02H 7/06; H02H 11/00; H02P 9/04; H02P 9/14

(52) U.S. Cl. .............................. 322/46; 322/38; 322/28

(58) Field of Search ....................... 322/46, 38; 363/37; 318/803

(56) References Cited

U.S. PATENT DOCUMENTS 3,768,001 A * 10/1973 Thorborg ..................... 363/71
3,829,759 A * 8/1974 Thorborg .................... 323/207
3,863,270 A * 1/1975 Haley et al. .................... 708/3
4,323,845 A 4/1982 Leach ........................ 323/224
4,652,797 A * 3/1987 Nilssen ................... 315/209 R
4,692,855 A * 9/1987 Kuroiwa et al. .............. 363/95
4,763,059 A * 8/1988 Espelage et al. ............ 318/811
5,010,471 A * 4/1991 Klaassens et al. .......... 363/160
5,136,494 A * 8/1992 Akagi et al. .................. 363/34
5,180,950 A * 1/1993 Nilssen ....................... 315/127
5,198,698 A * 3/1993 Paul et al. ..................... 307/64
5,260,644 A 11/1993 Curtis ........................ 323/226
5,428,283 A 6/1995 Kalman et al. ............. 318/729
5,483,436 A * 1/1996 Brown et al. ................. 363/98
5,661,390 A * 8/1997 Lipo et al. ................... 318/803
5,717,584 A 2/1998 Rajashekara et al. ......... 363/98
5,751,138 A * 5/1998 Venkata et al. ............. 323/207
5,808,448 A * 9/1998 Naito .......................... 322/13
5,808,880 A * 9/1998 Marvin ........................ 363/37
5,835,364 A * 11/1998 DeWinter et al. ............. 363/45

(List continued on next page.)

FOREIGN PATENT DOCUMENTS

DE 19 18 250 11/1970
DE 16 38 397 8/1971
DE 31 25 028 12/1982

OTHER PUBLICATIONS

E. Muljadi, et al.; "Axial Flux, Modular, Permanent–Magnet Generator with a Toroidal Winding for Wind Turbine Applications"; The 1998 IEEE St. Louis, MO, USA; Oct. 12–15, 1998; XP010313120 pp. 174–178.

Tomy Sebastian, et al.; "Transient Torque and Short Circuit Capabilities of Variable Speed Permanent Magnet Motors"; IEEE Transactions on Magnetics, vol. MAG–23, No. 5, Sep. 1987; XP002153873 pp. 3619–3621.

Z. Chen, et al.; "Wind Turbine Power Converters: A Comparative Study"; International Conference on Power Electronics and Variable Speed Drives, Sep. 21–23, 1998; Conference Publication No. 456; XP000800127, pp. 471–476.

Nassar Mendalek, et al.; "Nonlinear Control Strategy Applied to a Shunt Active Power Filter"; 32$^{nd}$ Annual IEEE Power Electronics Specialists Conference, Vancouver, CA, Jun. 17–21, 2001; XP001054333, pp. 1877–1882.

*Primary Examiner*—Joe Waks
*Assistant Examiner*—Julio C. Gonzalez
(74) *Attorney, Agent, or Firm*—Oral Caglar, Esq.

(57) ABSTRACT

An electrical power distribution system includes permanent magnet generator, and an ac regulator. The ac regulator includes an inverter shunt-connected to the permanent magnet generator, and an inverter control for causing the inverter to regulate voltage at output terminals of the generator by providing reactive power (either leading or lagging) that circulates between the inverter and the generator.

8 Claims, 3 Drawing Sheets

U.S. PATENT DOCUMENTS

| | | | | | | |
|---|---|---|---|---|---|---|
| 5,912,813 | A | * | 6/1999 | Kerkman et al. | ............. | 363/98 |
| 5,949,204 | A | * | 9/1999 | Huggett et al. | ............. | 318/254 |
| 6,014,017 | A | | 1/2000 | Weinhold et al. | ........... | 323/207 |
| 6,023,417 | A | | 2/2000 | Hava et al. | ................... | 363/41 |
| 6,069,808 | A | | 5/2000 | Panahi et al. | ................. | 363/98 |
| 6,166,928 | A | * | 12/2000 | Chandorkar | ................. | 363/34 |
| 6,166,930 | A | | 12/2000 | Czerwinski | .................. | 363/44 |
| 6,275,392 | B1 | * | 8/2001 | Streicher et al. | .............. | 363/35 |
| 6,417,650 | B1 | * | 7/2002 | Stefanovic et al. | ........... | 322/47 |

* cited by examiner

POWER GENERATING SYSTEM INCLUDING PERMANENT MAGNET GENERATOR AND SHUNT AC REGULATOR

BACKGROUND

The present invention relates to electrical power generation. More specifically, the present invention relates to a permanent magnet generator and control.

Constant voltage, variable frequency (CVVF) aircraft electrical distribution systems are being considered by commercial airframe companies. The CVVF systems would be required to deliver 115 volt, three phase electric power at frequencies varying between approximately 350 Hz, and 760 Hz to on-board electronics such as avionics, vapor cycle systems, and electrically driven hydraulic compressors.

A so-called "Two Pole Toothless" permanent magnet generator would be desirable for CVVF systems because of its robust rotor design and a low magnetic spring rate associated with a large air gap. This permanent magnet generator could be driven at prime mover speed (e.g., 24,000 rpm) without an intermediate gear train and constant speed drives. These features would allow the permanent magnet generator to be integrated directly with a prime mover such as an aircraft engine or an auxiliary power unit (APU). Permanent magnet rotors of the generator would form a single rotating unit with compressor and turbine wheels of the prime mover.

Despite their mechanical robustness, permanent magnet generators are not preferred for aircraft generator applications because 1) their output voltage increases essentially proportionally to speed, and 2) they do not survive short circuits applied to their terminals. Because of their low impedance, short circuit currents in excess of the machine current rating can flow under short circuit applications, causing excessive heat build up in the generator stator windings. A short in the stator windings can fuse the stator windings and destroy the generator. If a generator cannot survive the short circuit conditions, it cannot recover upon short circuit removal and it cannot deliver power.

Moreover, the excitation of permanent magnet generators is fixed, since it is provided by the permanent magnet contained within the rotor. Thus, voltage regulation becomes an issue, since the voltage is proportional to the speed of the rotor.

There is a need for a high-speed permanent magnet generator that can gracefully survive short circuit conditions. There is also a need for a control that can regulate the terminal voltage for a permanent magnet generator.

SUMMARY OF THE INVENTION

According to one aspect of the present invention, a system includes a permanent magnet generator, and an ac regulator. The ac regulator includes an inverter shunt-connected to the permanent magnet generator, and an inverter control for causing the inverter to regulate voltage at output terminals of the generator by providing reactive power (either leading or lagging) that circulates between the inverter and the generator.

DETAILED DESCRIPTION

Figure 1:
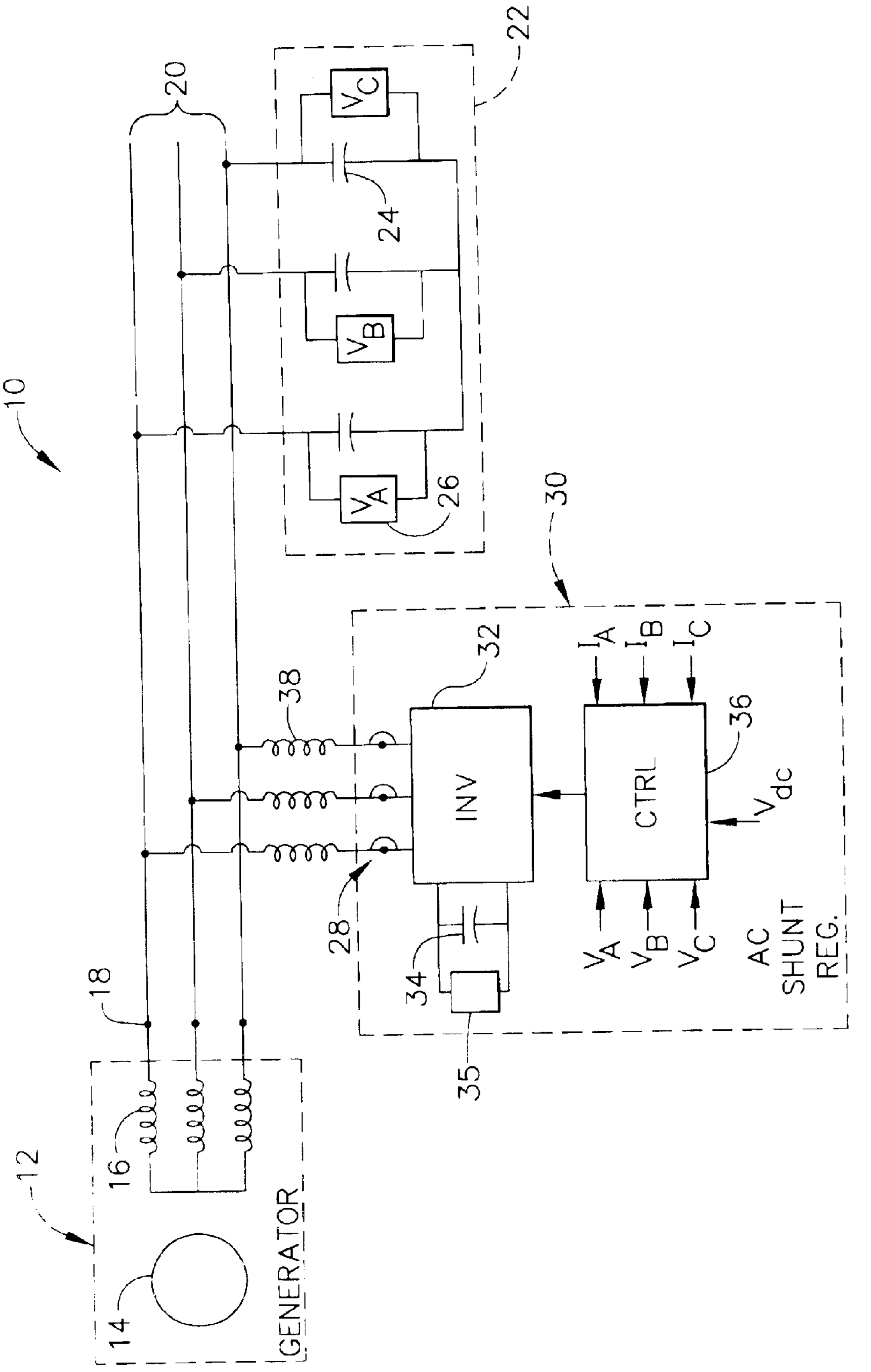
FIG. 1 is an illustration of an electrical power distribution system including a permanent magnet generator and an ac shunt regulator.

Referring to FIG. 1, an electrical power distribution system 10 includes a permanent magnet electrical generator 12. The generator 12 includes a permanent magnet rotor 14 and three-phase stator windings 16. The stator windings 16 terminate at output terminals 18.

The permanent magnet generator 12 may be designed to sustain rated current (and hence short circuit current) continuously. The generator 12 may be designed such that its stator winding reactance in conjunction with open circuit voltage produces a short circuit current that is essentially the same as the current required to produce rated power. Further, the generator 12 may be designed such that the short circuit current can circulate continuously without causing over-temperature of the windings 16, which in turn would lead to failure of the generator 12. With the generator 12 thermally designed for short circuit current, the short circuit currents will not damage the windings 16, since the thermal ratings under both short circuit and rated power conditions are essentially identical. In this application such a generator 12 is referred to as a "high reactance permanent magnet generator 12. For example, the stator windings 16 may have a reactance of approximately one per-unit, which implies that one per unit current flows in the stator windings 16 when a short circuit is applied to the terminals 18. When the generator 12 becomes shorted, the current flowing through the windings 16 (the "short circuit current") becomes equal to the rated current of the windings 16.

The generator 12 is operated at a fixed excitation. In an aircraft, for example, a two pole, three phase machine when rotated at 24,000 rpm would produce a terminal voltage with an electrical frequency of 400 Hz. The open circuit voltage, in conjunction with the winding reactance, determines the short circuit current.

A three-phase power distribution line 20 is connected to the terminals 18, and a capacitor bank 22 is connected to the power distribution line 20. The capacitor bank 22 includes three capacitors 24, one for each phase. The capacitor bank 22 is required in aircraft systems to meet power quality and conducted emissions. Three ac voltage sensors 26 sense the voltages ($V_A$, $V_B$, $V_C$) across the three capacitors 24 of the capacitor bank 22.

The system 10 further includes an ac shunt regulator 30. The ac regulator 30 includes a PWM inverter 32 coupled through inductors 38 to the power distribution line 20. The inverter 32 may be a conventional six-switch inverter with associated snubbers and diodes, or any other form of voltage controlled inverter. A dc link capacitor 34 is coupled across the inverter 32 to produce a low source impedance for the inverter 32. The inductors 38 smooth out current pulses that would otherwise result when the inverter switches are gated on, and the dc link capacitor 34 is placed in parallel with the capacitors 24 of the capacitor bank 22. Three current sensors 28 are connected in series with the inductors 38 and sense the currents ($i_A$, $i_B$, $i_C$) on the three phases of the inverter output.

The ac regulator 30 also includes an inverter control 36 for causing the inverter 32 to regulate voltage at the output terminals 18 of the generator 12 by providing reactive power (either leading or lagging) that circulates between the inverter 32 and the generator 12. The ac regulator 30 maintains a constant ac voltage at a point of regulation (POR) on the power distribution line 20 by injecting into the distribution system a reactive current at the output terminals 18 of the generator 12. This reactive current in conjuncton with the distribution system reactive current regulates the output voltage of the generator 12 (that is, the voltage at the terminals 18). The point of regulation shown in FIG. 1 is the capacitor bank 22.

The control methodology of the inverter control 36 involves Park vectors. Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain (where time is a parameter). A voltage Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984).

Figure 2:
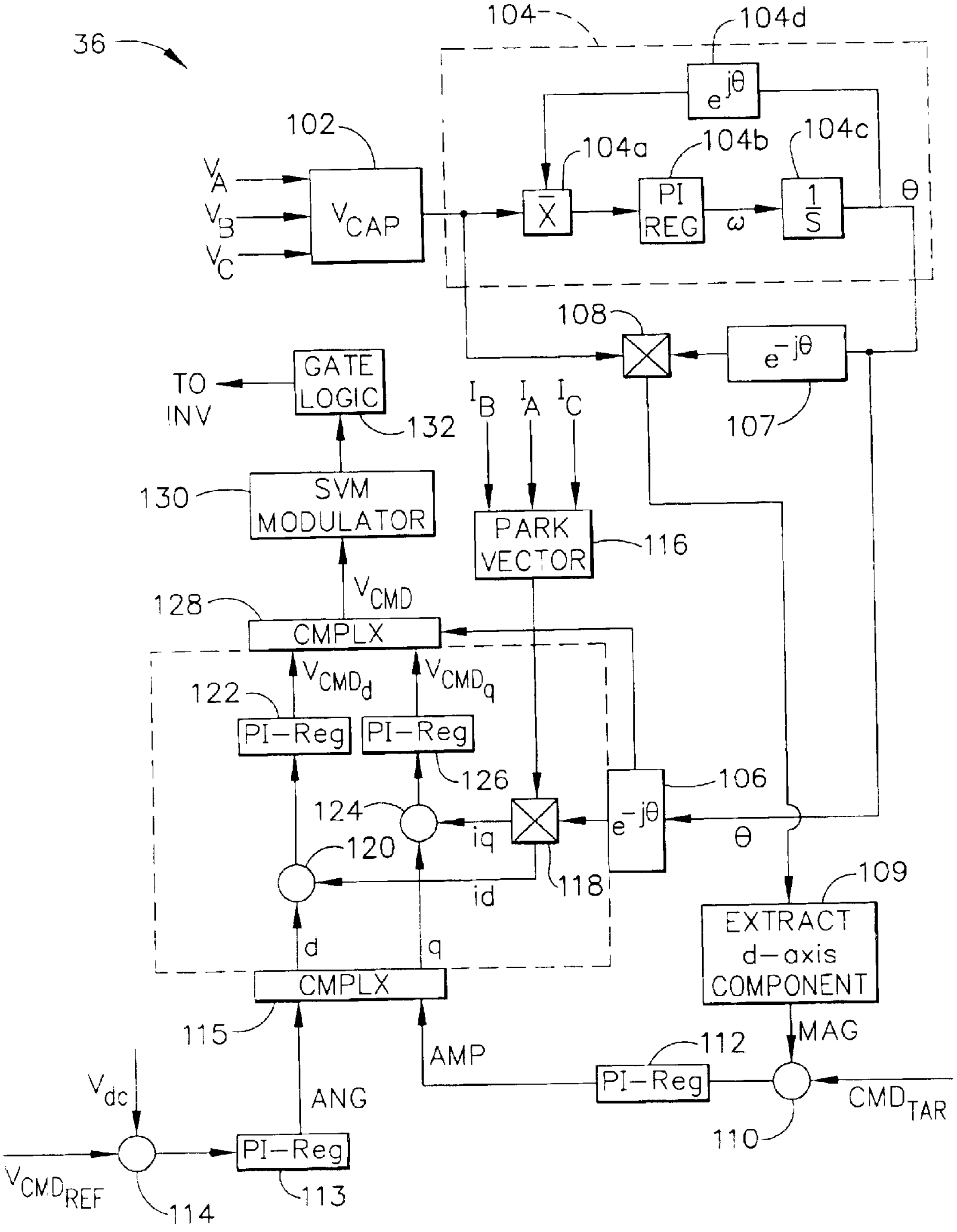
FIG. 2 is an illustration of an exemplary inverter control for the ac shunt regulator.

FIG. 2 shows an exemplary control methodology for the inverter control 36. The capacitor bank voltages ($V_A$, $V_B$, $V_C$), the sensed currents ($i_A$, $i_B$, $i_C$), and a target voltage command ($CMD_{TAR}$) are supplied to the Park vector-based inverter control 36, which operates in a synchronous reference frame with respect to capacitor voltage. The orthogonal axes of this co-ordinate system are referred to as the d and q axes. In many aircraft applications, the voltage command is typically 115 $V_{RMS}$ line-to-neutral.

A Park vector representation of line-to-neutral voltage of the capacitor bank voltage (VCAP) is generated from the measurements of the voltages ($V_A$, $V_B$, $V_C$) across each of the capacitors 24 (block 102).

The angle (θ) of the capacitor bank voltage Park Vector (VCAP), also referred to as the angle of the fundamental, may be estimated from this vector (VCAP) as follows (block 104). A vector cross-product multiplication (block 104*a*) of the capacitor voltage Park vector (VCAP) and a complex rotator having the form exp(jθ) is performed. The product of this vector multiplication is operated upon by a PI regulator 104*b* whose output (ω) is the estimated angular velocity of the capacitor bank voltage Park Vector (VCAP). The estimated angular velocity (ω) is integrated (block 104*c*) to produce the estimated angle (θ) of the capacitor bank voltage Park Vector (VCAP). This closed loop continuously updates the estimate of the angle (θ), thereby reducing the error between the capacitor bank voltage Park vector (VCAP) and the complex rotator exp(jθ).

The estimated angle (θ) of capacitor bank voltage Park vector (VCAP) is used to derive the complex rotator (block 104*d*). The complex rotator is a unit vector having the form exp(jθ). The complex rotator may be derived by computing the function cos(θ)+sin(θ). This complex rotator, and its complex conjugate will be used to transform vectors from the stationary to synchronous, and synchronous to the stationary reference frame with respect to the capacitor bank voltage Park vector (VCAP).

The complex conjugate exp(−jθ) (block 107) is used to derive the magnitude of the capacitor bank voltage Park vector (VCAP).

The complex rotator exp(−jθ) (block 107) and the capacitor bank voltage Park vector (VCAP) are multiplied together (block 108), and the direct axis component, also referred to as the magnitude of the fundamental (MAG), is extracted (block 109) from the product and used as the voltage feedback. The magnitude of the fundamental (MAG) represents the amplitude of the capacitor bank voltage Park vector (VCAP) at the ac interface (the point of regulation).

An outer loop of the inverter control 36 generates a vector-based current command by combining two signals derived from comparing the amplitude of the capacitor bank voltage Park vector (VCAP), and the dc link capacitor voltage (Vdc) (the dc link voltage may be measured by the voltage sensor 35 shown in FIG. 1). The signal (MAG) representing magnitude of the fundamental of the capacitor bank voltage Park vector (VCAP) is compared with the target voltage command ($CMD_{TAR}$) via summing junction 110. A PI-regulator 112 operates on the error signal to provide the amplitude component (AMP) of the vector-based current command. This PI-regulator 112 has appropriate limits associated with it: between plus and minus rated current of the current rating of the inverter 32.

A phase angle component (ANG) of the current command may be derived as follows. A reference voltage command ($CMD_{REF}$) is compared to measured dc link voltage a summing junction 114. The actual value of the reference voltage command ($CMD_{REF}$) may be determined from the regulated capacitor bank voltage and the inverter output inductance. The error signal provided by the summing junction 114 is processed by a PI regulator 113 to compute the angle component (ANG) of the current command. The error signal is regulated at an angle very close to 90 degrees to ensure that the inverter output current is in quadrature with the capacitor bank voltage Park vector (VCAP). The inverter 32 is therefore handling principally reactive power (power that is circulated cyclically at the fundamental frequency between the capacitor bank 22 and the generator 12). Small changes from 90 degrees can be made so that sufficient real power is supplied to the dc link so as to make up for inefficiencies in the operation of the inverter 32.

The amplitude component (AMP) and the phase angle component (ANG) are combined to produce a vector-based current command having the form $AMPe^{-jANG}$ (block 115). This polar co-ordinate vector command is converted into Cartesian (d,q) coordinates (block 115).

A Park vector representation of inverter current (IINV) is generated (block 116) from the measurements ($i_A$, $i_B$, $i_C$) taken by the current sensors 28. The inverter current Park vector (IINV) is transformed from a stationary reference frame to a synchronous reference frame with respect to the capacitor bank voltage Park vector (using block 118).

The direct component (id) of the transformed inverter current Park vector is summed with the direct component (d) of the current command at a second summing junction 120, and the output of the second summing junction 120 is regulated by a PI-regulator 122. An output of the PI-regulator 122 provides a direct component ($V_{CMDd}$) of a voltage command.

The quadrature component (iq) of the transformed inverter current Park vector (IINV) is summed with the quadrature component (q) of the current command at a summing junction 124, and the output of the summing junction 124 is regulated by a PI-regulator 126. An output of the PI-regulator 126 provides a quadrature component ($V_{CMDq}$) of the voltage command.

The direct and quadrature components ($V_{CMDd}$ and $V_{CMDq}$) of the voltage command are combined to produce an inverter Park vector voltage command. The complex rotator having the form exp(jθ) is used to transform the inverter Park vector voltage command from the synchronous frame back to a stationary frame. The result of the transformation is the voltage command ($V_{CMD}$).

The voltage command ($V_{CMD}$) is supplied to space vector modulation (SVM) logic 130. The SVM logic 130 uses the voltage command ($V_{CMD}$) and space vector modulation to command gate logic 132 to turn on and off the switches of the inverter 32. The switches of the inverter 32 may be modulated at a high frequency (e.g., 40 kHz) in order to minimize the size of the capacitors 22 and 34, and to enable compensation of characteristic harmonics up to a frequency that is limited by the modulation frequency.

Figure 3:
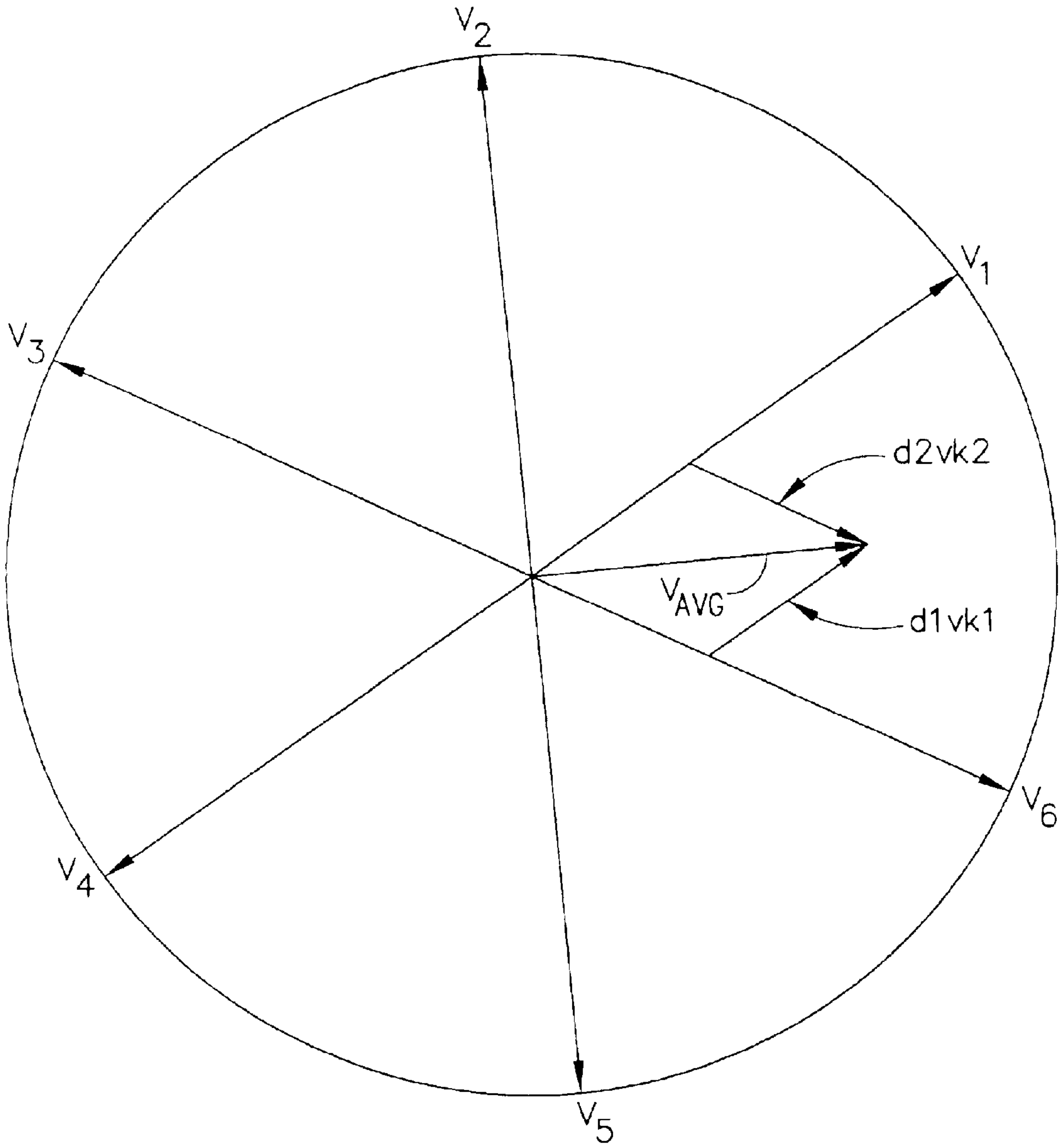
FIG. 3 is a vector diagram for voltage mode SVM control.

FIG. 3 illustrates voltage mode SVM. The SVM logic 130 selects inverter switches that create a rotating vector ($V_{AVG}$). The rotating vector ($V_{AVG}$) produces a sinusoidal voltage that best matches the inverter voltage commanded by the current regulator output Vinv. Typical SVM algorithms may be used to compute duty cycles (d1 and d2) and select the appropriate voltage vectors (V1, V2, V3, V4, V5, and V6) or the null vector so that the space-averaged vector produced (d1vk1+d2vk2) approximates the commanded vector ($V_{AVG}$).

Thus disclosed is a permanent magnet generator that can gracefully survive short circuit conditions. Such a permanent magnet generator and control may be used to generate CVVF power in aircraft electrical power distribution systems. Further, short circuit current can be supplied by such a system without exceeding rated current for the generator and the inverter.

The permanent magnet generator may be integrated with a prime mover such as an aircraft engine or auxiliary power unit. An intermediate gearbox or constant speed drive is not needed. This reduces mechanical complexity, parts count, and system weight. Reducing the system weight reduces fuel costs and, therefore, the cost of aircraft operation. Reducing the parts count reduces the chance of system failure.

The power distribution system 10 is a variable frequency system because the speed of the generator may be driven by the prime mover. In an aircraft distribution system, the speed can vary over a speed range of 2:1. The output frequency of the generator 12 is proportional to the speed of rotation The ac shunt regulator maintains a constant voltage at an output of the generator. An intermediate dc link and additional inverter are not required.

The inverter control 36 is not limited to operation in the d-q synchronous reference frame with respect to capacitor voltage. Other reference frames may be used. For example, the inverter control 36 may operate in the d-q stationary reference frame utilizing complex poles in the current regulators 122 and 126, or may utilize other synchronous reference frames such as generator rotor position.

Although the system is described in connection with three-phase ac power, it is not so limited. For instance, the system may utilize two-phase ac power The inverter control 36 may be implemented in software, hardware or any combination thereof.

Values for the PI-regulators 112, 122 and 126 are application-specific. The regulator values are dependent upon desired responses of the inverter control 36 and other system constraints and inputs.

The present invention is not limited to the specific embodiment described above. Instead, the present invention is construed according to the claims that follow.

What is claimed is:

1. Apparatus for regulating power at an ac interface on a power distribution line of a power distribution system, the apparatus comprising:

an inverter shunt-connected to the power distribution line;

means for measuring voltage at the ac interface; and means, responsive to measured voltage, for controlling the inverter to regulate voltage at the ac interface by providing reactive power to, and drawing reactive power from, the power distribution line;

wherein the means for controlling the inverter includes means for generating a vector-based current command; wherein the vector-based current command is used to generate a vector-based voltage command; the vector-based voltage command is used to perform pulse width modulation of the inverter; and an amplitude component of the vector-based current command is computed using voltage error at the ac interface.

2. A method of using an inverter to regulate power at an ac interface on a power distribution line of a power distribution system, a capacitor bank coupled to the power distribution line, the method comprising controlling the inverter to regulate voltage at the ac interface by comparing voltages on the capacitor bank to a reference value, and providing reactive power to, and drawing reactive power from, the power distribution line in response to the comparison; wherein the inverter control is performed by generating a vector-based current command; and the method further comprises:

using the current command to generate a vector-based voltage command; and using the voltage command to perform pulse width modulation of the inverter; and wherein an amplitude component of the vector-based current command is computed using voltage error at the ac interface.

3. The method of claim 2, wherein the reactive power is the difference between reactive power supplied by a generator and reactive power demanded by a load connected to the power distribution line.

4. The method of claim 2, wherein inverter control is performed in a synchronous reference frame with respect to voltage at the ac interface.

5. The method of claim 3, wherein the capacitor bank is coupled to the output terminals of the generator; and wherein the inverter control is performed in a d-q synchronous reference frame with respect to capacitor voltage.

6. A method of using an inverter to regulate power at an ac interface on a power distribution line of a power distribution system, the method comprising controlling the inverter to regulate voltage at the ac interface by providing reactive power to, and drawing reactive power from, the power distribution line; wherein the inverter control is performed in a synchronous reference frame with respect to voltage at the ac interface and includes generating a vector-based current command, using the current command to generate a vector-based voltage command; and using the voltage command to perform pulse width modulation of the inverter; and wherein an amplitude component of the vector-based current command is computed using voltage error at the ac interface.

7. The method of claim 5, wherein a phase angle component of the vector-based current command is a fixed value.

8. A method of using an inverter to regulate power at an ac interface on a power distribution line of a power distribution system, the method comprising controlling the inverter to regulate voltage at the ac interface by providing reactive power to, and drawing reactive power from, the power distribution line, wherein the inverter control is performed in a synchronous reference frame with respect to voltage at the ac interface and includes generating a vector-based current command, summing a direct component of the vector-based current command with a direct component of an inverter current Park vector and PI-regulating this first sum to create a direct component of a vector-based voltage command, summing a quadrature component of the vector-based current command with a quadrature component of the inverter current Park vector and PI-regulating this second sum to create a quadrature component of the voltage command, the vectors being synchronous with respect to a Park vector representing voltage at the ac interface, and using the voltage command to perform space vector modulation of the inverter.

* * * * *